US008251141B2

(12) United States Patent
Eoff et al.

(10) Patent No.: US 8,251,141 B2
(45) Date of Patent: *Aug. 28, 2012

(54) METHODS USEFUL FOR CONTROLLING FLUID LOSS DURING SAND CONTROL OPERATIONS

(75) Inventors: Larry S. Eoff, Duncan, OK (US); David L. Brown, Temple, OK (US); Eldon D. Dalrymple, Duncan, OK (US); Paul S. Brown, Duncan, OK (US)

(73) Assignee: Halliburton Energy Services, Inc., Duncan, OK (US)

( * ) Notice: Subject to any disclaimer, the term of this patent is extended or adjusted under 35 U.S.C. 154(b) by 325 days.

This patent is subject to a terminal disclaimer.

(21) Appl. No.: 11/501,595

(22) Filed: Aug. 9, 2006

(65) Prior Publication Data

US 2006/0266522 A1   Nov. 30, 2006

Related U.S. Application Data

(63) Continuation-in-part of application No. 11/360,215, filed on Feb. 22, 2006, which is a continuation-in-part of application No. 11/102,062, filed on Apr. 8, 2005, which is a continuation-in-part of application No. 10/881,198, filed on Jun. 29, 2004, now Pat. No. 7,117,942, and a continuation-in-part of application No. 10/760,443, filed on Jan. 20, 2004, which is a continuation-in-part of application No. 10/440,337, filed on May 16, 2003, now abandoned, and a continuation-in-part of application No. 10/612,271, filed on Jul. 2, 2003, now Pat. No. 7,182,136.

(51) Int. Cl.
*E21B 43/22* (2006.01)
*E21B 43/04* (2006.01)

(52) U.S. Cl. ............... 166/278; 166/305.1; 166/308.1

(58) Field of Classification Search .............. None
See application file for complete search history.

(56) References Cited

U.S. PATENT DOCUMENTS

| | | | |
|---|---|---|---|
| 2,278,838 A | 4/1942 | Groote et al. | |
| 2,670,329 A | 2/1954 | Jones | |
| 2,687,375 A | 8/1954 | Fischer et al. | |
| 2,689,244 A | 9/1954 | Jones | |
| 2,819,278 A | 1/1958 | De Groots et al. | |
| 2,843,573 A | 7/1958 | Melamed | 526/260 |
| 2,863,832 A | 12/1958 | Perrine | 252/8.55 |
| 2,877,179 A | 3/1959 | Hughes et al. | |
| 2,910,436 A | 10/1959 | Fatt et al. | 252/8.55 |
| 3,008,898 A | 11/1961 | Hughes et al. | |
| 3,052,298 A | 9/1962 | Mallot | |
| 3,065,247 A | 11/1962 | De Groots et al. | |
| 3,138,205 A | 6/1964 | Kerver et al. | |
| 3,215,199 A | 11/1965 | Dilgren | 166/38 |
| 3,251,415 A | 5/1966 | Bombardieri et al. | 166/42 |
| 3,251,778 A | 5/1966 | Dickson | 252/82 |
| 3,258,428 A | 6/1966 | Dickson | 252/180 |
| 3,265,512 A | 8/1966 | Dickson | 106/14 |
| 3,271,307 A | 9/1966 | Dickson et al. | |
| 3,297,090 A | 1/1967 | Dilgren | 166/38 |
| 3,307,630 A | 3/1967 | Dilgren et al. | 166/38 |
| 3,326,890 A | 6/1967 | Engelskirchen et al. | |
| 3,336,980 A | 8/1967 | Rike | |
| 3,347,789 A | 10/1967 | Dickson | 252/9.55 |
| 3,382,924 A | 5/1968 | Veley et al. | 166/42 |
| 3,404,114 A | 10/1968 | Snyder et al. | 524/812 |
| 3,434,971 A | 3/1969 | Atkins | 252/8.55 |
| 3,441,085 A | 4/1969 | Gidley | 166/307 |
| 3,451,818 A | 6/1969 | Wareham | 96/78 |
| 3,489,222 A | 1/1970 | Millhone et al. | |
| 3,601,194 A | 8/1971 | Gallus | 166/283 |
| 3,615,794 A | 10/1971 | Nimerick | |
| 3,637,656 A | 1/1972 | Germino et al. | |
| 3,647,507 A | 3/1972 | Ashcraft | 427/288 |
| 3,647,567 A | 3/1972 | Schweri | |
| 3,689,418 A | 9/1972 | Cenci et al. | |
| 3,689,468 A | 9/1972 | Cenci et al. | 526/312 |
| 3,708,013 A | 1/1973 | Dismukes | |
| 3,709,298 A | 1/1973 | Pramann | |
| 3,744,566 A | 7/1973 | Szabo et al. | 166/275 |
| 3,818,991 A | 6/1974 | Nimerick | |
| 3,902,557 A | 9/1975 | Shaughnessy et al. | |
| 3,910,862 A | 10/1975 | Barabas et al. | 260/79.3 MU |
| 3,943,060 A | 3/1976 | Martin et al. | |
| 3,983,941 A | 10/1976 | Fitch | |
| 4,029,544 A | 6/1977 | Jarowenko et al. | |
| 4,052,343 A | 10/1977 | Cunningham | |
| 4,052,345 A | 10/1977 | Austin et al. | 521/129 |
| 4,129,183 A | 12/1978 | Kalfoglou | 166/300 |
| 4,129,534 A | 12/1978 | Cunningham | 521/38 |
| 4,142,595 A | 3/1979 | Anderson et al. | |
| 4,152,274 A | 5/1979 | Phillips et al. | |
| 4,158,521 A | 6/1979 | Anderson et al. | 405/264 |
| 4,158,726 A | 6/1979 | Kamada et al. | 526/200 |
| 4,228,277 A | 10/1980 | Landoll | |
| 4,299,710 A | 11/1981 | Dupre et al. | 252/8.5 A |
| 4,306,981 A | 12/1981 | Blair, Jr. | |
| 4,337,828 A | 7/1982 | Blair, Jr. | |

(Continued)

FOREIGN PATENT DOCUMENTS

DE    2 250 552    4/1974

(Continued)

OTHER PUBLICATIONS

U.S. Appl. No. 10/763,800, filed Jan. 24, 2004, Eoff, et al.

(Continued)

*Primary Examiner* — Angela M DiTrani
(74) *Attorney, Agent, or Firm* — Robert A. Kent; McDermott Will & Emery LLP

(57) ABSTRACT

Methods comprising providing a carrier fluid comprising an aqueous-based component, a water-soluble relative permeability modifier, and gravel particulates wherein the water-soluble relative permeability modifier suspends at least a portion of the gravel particulates; and introducing the carrier fluid into a well bore penetrating a subterranean formation, such that the gravel particulates form a gravel pack near the well bore. In some embodiments, the carrier fluid is substantially free of a viscosifying agent.

6 Claims, No Drawings

U.S. PATENT DOCUMENTS

| | | | |
|---|---|---|---|
| 4,366,071 A | 12/1982 | McLaughlin et al. | 252/8.55 R |
| 4,366,072 A | 12/1982 | McLaughlin et al. | 252/8.55 R |
| 4,366,073 A | 12/1982 | McLaughlin et al. | 252/8.55 R |
| 4,366,074 A | 12/1982 | McLaughlin et al. | 252/8.55 R |
| 4,374,739 A | 2/1983 | McLaughlin et al. | 252/8.55 R |
| 4,393,939 A | 7/1983 | Smith et al. | 166/293 |
| 4,395,340 A | 7/1983 | McLaughlin | 252/8.55 D |
| 4,401,789 A | 8/1983 | Gideon | 524/827 |
| 4,439,334 A | 3/1984 | Borchardt | 252/8.55 D |
| 4,440,649 A | 4/1984 | Loftin et al. | 252/8.5 C |
| 4,441,556 A | 4/1984 | Powers et al. | |
| 4,447,342 A | 5/1984 | Borchardt et al. | 252/8.55 D |
| 4,460,627 A | 7/1984 | Weaver et al. | 427/212 |
| 4,462,718 A | 7/1984 | McLaughlin et al. | 405/264 |
| 4,499,214 A | 2/1985 | Sortwell | |
| 4,532,052 A * | 7/1985 | Weaver et al. | 507/222 |
| 4,536,297 A | 8/1985 | Loftin et al. | 252/8.5 C |
| 4,536,303 A | 8/1985 | Borchardt | 252/8.55 R |
| 4,536,305 A | 8/1985 | Borchardt et al. | 252/8.55 R |
| 4,552,670 A | 11/1985 | Lipowski et al. | 704/553 |
| 4,554,081 A | 11/1985 | Borchardt et al. | 252/8.5 A |
| 4,563,292 A | 1/1986 | Borchardt | 252/8.5 S |
| 4,604,216 A | 8/1986 | Irvin et al. | 252/8.51 |
| 4,608,139 A | 8/1986 | Craun et al. | 428/457 |
| 4,619,776 A | 10/1986 | Mondshine | |
| 4,627,926 A | 12/1986 | Peiffer et al. | 252/8.55 R |
| 4,631,138 A | 12/1986 | Johns et al. | |
| 4,662,448 A | 5/1987 | Ashford et al. | |
| 4,671,883 A | 6/1987 | Connell | 252/8.515 |
| 4,693,639 A | 9/1987 | Hollenbeak et al. | 405/263 |
| 4,699,722 A | 10/1987 | Dymond et al. | 252/8.551 |
| 4,702,319 A | 10/1987 | Bock et al. | |
| 4,730,028 A | 3/1988 | Bock et al. | 526/225 |
| 4,814,096 A | 3/1989 | Evani | 507/224 |
| 4,828,725 A | 5/1989 | Lai et al. | |
| 4,828,726 A | 5/1989 | Himes et al. | 252/8.553 |
| 4,856,590 A | 8/1989 | Caillier | |
| 4,870,167 A | 9/1989 | Zody et al. | |
| 4,941,537 A | 7/1990 | Langemeier et al. | |
| 4,956,104 A | 9/1990 | Cowan et al. | |
| 4,959,432 A | 9/1990 | Fan et al. | 526/287 |
| 4,960,876 A | 10/1990 | Molteni et al. | |
| 4,993,448 A | 2/1991 | Karydas et al. | |
| 5,051,197 A | 9/1991 | Kalfayan et al. | |
| 5,071,934 A | 12/1991 | Peiffer | 526/307 |
| 5,097,904 A | 3/1992 | Himes | 166/294 |
| 5,105,886 A | 4/1992 | Strubhar et al. | |
| 5,146,986 A | 9/1992 | Dalrymple | 166/294 |
| 5,160,642 A | 11/1992 | Schield et al. | 252/8.551 |
| 5,197,544 A | 3/1993 | Himes | 166/294 |
| 5,208,216 A | 5/1993 | Williamson et al. | 507/120 |
| 5,244,042 A | 9/1993 | Dovan et al. | 166/270 |
| 5,248,665 A | 9/1993 | Hale et al. | |
| 5,256,651 A | 10/1993 | Phelps et al. | |
| 5,271,466 A | 12/1993 | Harms | 166/300 |
| 5,342,530 A | 8/1994 | Aften et al. | 252/8.551 |
| 5,379,841 A | 1/1995 | Pusch et al. | 166/295 |
| 5,407,909 A | 4/1995 | Goodhue, Jr. et al. | |
| 5,424,284 A | 6/1995 | Patel et al. | |
| 5,445,223 A | 8/1995 | Nelson et al. | |
| 5,473,059 A | 12/1995 | Yeh | |
| 5,482,116 A | 1/1996 | El-Rabaa et al. | |
| 5,566,760 A * | 10/1996 | Harris | 166/308.6 |
| 5,597,783 A | 1/1997 | Audibert et al. | 507/120 |
| 5,607,902 A | 3/1997 | Smith et al. | 507/120 |
| 5,637,556 A | 6/1997 | Argillier et al. | 507/120 |
| 5,643,460 A | 7/1997 | Marble et al. | |
| 5,646,093 A | 7/1997 | Dino | |
| 5,663,123 A | 9/1997 | Goodhue, Jr. et al. | |
| 5,669,456 A | 9/1997 | Audibert et al. | 175/72 |
| 5,681,796 A | 10/1997 | Nimerick | |
| 5,704,426 A | 1/1998 | Rytlewski et al. | |
| 5,720,347 A | 2/1998 | Audibert et al. | 166/294 |
| 5,728,653 A | 3/1998 | Audibert et al. | 507/222 |
| 5,735,349 A | 4/1998 | Dawson et al. | 166/295 |
| 5,755,286 A | 5/1998 | Ebinger | |
| 5,887,653 A | 3/1999 | Bishop et al. | 166/281 |
| 5,908,814 A | 6/1999 | Patel et al. | |
| 5,944,106 A | 8/1999 | Dalrymple et al. | 166/281 |
| 5,972,848 A | 10/1999 | Audibert et al. | 507/119 |
| 5,979,557 A | 11/1999 | Card et al. | 166/300 |
| 5,990,052 A | 11/1999 | Harris | |
| 6,020,289 A | 2/2000 | Dymond | |
| 6,047,773 A | 4/2000 | Zeltmann et al. | |
| 6,070,664 A | 6/2000 | Dalrymple et al. | 166/281 |
| 6,124,245 A | 9/2000 | Patel | 507/120 |
| 6,162,766 A | 12/2000 | Muir et al. | |
| 6,187,839 B1 | 2/2001 | Eoff et al. | 523/130 |
| 6,194,356 B1 | 2/2001 | Jones et al. | |
| 6,209,646 B1 | 4/2001 | Reddy et al. | |
| 6,228,812 B1 | 5/2001 | Dawson et al. | 507/221 |
| 6,237,687 B1 | 5/2001 | Barbee, Jr. et al. | 166/278 |
| 6,242,390 B1 | 6/2001 | Mitchell et al. | |
| 6,248,697 B1 | 6/2001 | Goodhue, Jr. et al. | |
| 6,253,851 B1 | 7/2001 | Schroeder, Jr. et al. | 166/278 |
| 6,277,900 B1 | 8/2001 | Oswald et al. | 523/130 |
| 6,281,172 B1 | 8/2001 | Warren et al. | |
| 6,283,210 B1 | 9/2001 | Soliman et al. | 166/270 |
| 6,291,404 B2 | 9/2001 | House | |
| 6,358,889 B2 | 3/2002 | Waggenspack et al. | |
| 6,359,047 B1 | 3/2002 | Thieu et al. | 524/376 |
| 6,364,016 B1 | 4/2002 | Dalrymple et al. | 166/270 |
| 6,380,137 B1 | 4/2002 | Heier et al. | 507/121 |
| 6,454,003 B1 | 9/2002 | Chang et al. | |
| 6,476,169 B1 | 11/2002 | Eoff et al. | 526/307.2 |
| 6,476,283 B1 | 11/2002 | Devore et al. | 585/250 |
| 6,497,283 B1 | 12/2002 | Eoff et al. | 166/293 |
| 6,516,885 B1 | 2/2003 | Munday | 166/295 |
| 6,520,255 B2 | 2/2003 | Tolman et al. | |
| 6,562,762 B2 | 5/2003 | Cowan et al. | |
| 6,569,983 B1 | 5/2003 | Treybig et al. | 528/102 |
| 6,601,648 B2 | 8/2003 | Ebinger | |
| 6,605,570 B2 * | 8/2003 | Miller et al. | 507/211 |
| 6,607,035 B1 | 8/2003 | Reddy et al. | |
| 6,609,578 B2 | 8/2003 | Patel et al. | 175/64 |
| 6,626,241 B2 | 9/2003 | Nguyen | |
| 6,627,719 B2 | 9/2003 | Whipple et al. | 526/319 |
| 6,637,517 B2 | 10/2003 | Samuel et al. | |
| 6,656,885 B2 | 12/2003 | House et al. | |
| 6,662,874 B2 | 12/2003 | Surjaatmadja et al. | |
| 6,702,044 B2 | 3/2004 | Reddy et al. | |
| 6,710,107 B2 | 3/2004 | Audibert et al. | 524/5 |
| 6,723,683 B2 | 4/2004 | Crossman et al. | |
| 6,743,288 B2 | 6/2004 | Eoff et al. | 106/724 |
| 6,756,345 B2 | 6/2004 | Pakulski et al. | |
| 6,764,981 B1 | 7/2004 | Eoff et al. | |
| 6,767,867 B2 | 7/2004 | Chatterji et al. | 507/216 |
| 6,767,869 B2 | 7/2004 | DiLullo et al. | |
| 6,780,822 B2 | 8/2004 | Cowan et al. | |
| 6,787,506 B2 | 9/2004 | Blair et al. | 507/222 |
| 6,790,812 B2 | 9/2004 | Halliday et al. | |
| 6,800,593 B2 | 10/2004 | Dobson, Jr. et al. | |
| 6,803,348 B2 * | 10/2004 | Jones et al. | 507/221 |
| 6,846,420 B2 | 1/2005 | Reddy et al. | |
| 6,855,672 B2 | 2/2005 | Poelker et al. | 507/225 |
| 6,872,820 B2 | 3/2005 | Weber et al. | |
| 6,884,760 B1 | 4/2005 | Brand et al. | |
| 6,962,203 B2 | 11/2005 | Funchess | |
| 6,978,836 B2 | 12/2005 | Nguyen et al. | |
| 6,981,552 B2 | 1/2006 | Reddy et al. | |
| 7,007,752 B2 | 3/2006 | Reddy et al. | |
| 7,008,908 B2 | 3/2006 | Chan et al. | |
| 7,036,587 B2 | 5/2006 | Munoz, Jr. et al. | |
| 7,036,589 B2 | 5/2006 | Nguyen | |
| 7,081,439 B2 | 7/2006 | Sullivan et al. | |
| 7,087,554 B2 | 8/2006 | Youngson et al. | |
| 7,091,159 B2 | 8/2006 | Eoff et al. | |
| 7,114,568 B2 | 10/2006 | Eoff et al. | |
| 7,117,942 B2 | 10/2006 | Dalrymple et al. | |
| 7,159,656 B2 | 1/2007 | Eoff et al. | |
| 7,178,610 B2 | 2/2007 | Bell | |
| 7,182,136 B2 | 2/2007 | Dalrymple et al. | |
| 7,207,387 B2 | 4/2007 | Eoff et al. | |
| 7,216,707 B2 | 5/2007 | Eoff et al. | |
| 7,220,708 B2 | 5/2007 | Zamora et al. | |
| 7,273,099 B2 | 9/2007 | East, Jr. et al. | |
| 7,398,825 B2 | 7/2008 | Nguyen et al. | |

| | | | |
|---|---|---|---|
| 7,427,583 | B2 | 9/2008 | Couillet et al. |
| 7,563,750 | B2 | 7/2009 | Eoff et al. |
| 7,589,048 | B2 | 9/2009 | Eoff et al. |
| 7,595,283 | B2 | 9/2009 | Eoff et al. |
| 7,759,292 | B2 | 7/2010 | Eoff et al. |
| 8,008,235 | B2 | 8/2011 | Eoff et al. |
| 8,091,638 | B2 * | 1/2012 | Dusterhoft et al. ............ 166/279 |
| 2002/0123433 | A1 | 9/2002 | Goodhue, Jr. et al. |
| 2003/0013871 | A1 | 1/2003 | Mallon et al. |
| 2003/0019627 | A1 | 1/2003 | Qu et al. ................ 166/281 |
| 2003/0104948 | A1 | 6/2003 | Poelker et al. ............. 507/100 |
| 2003/0114317 | A1 | 6/2003 | Benton et al. |
| 2003/0139298 | A1 | 7/2003 | Fu et al. |
| 2003/0191030 | A1 | 10/2003 | Blair et al. .................. 507/225 |
| 2004/0045712 | A1 | 3/2004 | Eoff et al. .................... 166/293 |
| 2004/0102331 | A1 | 5/2004 | Chan et al. .................. 507/100 |
| 2004/0171495 | A1 | 9/2004 | Zamora et al. .............. 507/100 |
| 2004/0209780 | A1 * | 10/2004 | Harris et al. ................ 507/117 |
| 2004/0220058 | A1 | 11/2004 | Eoff et al. .................. 507/200 |
| 2004/0229756 | A1 | 11/2004 | Eoff et al. .................. 507/219 |
| 2004/0229757 | A1 | 11/2004 | Eoff et al. .................. 507/219 |
| 2005/0000694 | A1 | 1/2005 | Dalrymple et al. ........... 166/307 |
| 2005/0194140 | A1 | 9/2005 | Dalrymple et al. ........... 166/279 |
| 2005/0211439 | A1 | 9/2005 | Willett et al. .............. 166/308.1 |
| 2005/0230114 | A1 | 10/2005 | Eoff et al. |
| 2005/0230116 | A1 | 10/2005 | Eoff et al. ................. 166/305.1 |
| 2005/0284632 | A1 | 12/2005 | Dalrymple et al. |
| 2006/0016596 | A1 | 1/2006 | Pauls et al. |
| 2006/0124309 | A1 | 6/2006 | Nguyen et al. |
| 2006/0137875 | A1 | 6/2006 | Dusterhoft et al. |
| 2006/0234874 | A1 | 10/2006 | Eoff et al. |
| 2006/0240994 | A1 | 10/2006 | Eoff et al. |
| 2006/0283592 | A1 | 12/2006 | Sierra et al. |
| 2007/0012445 | A1 | 1/2007 | Nguyen et al. |
| 2007/0114032 | A1 | 5/2007 | Stegent et al. |
| 2008/0070805 | A1 | 3/2008 | Munoz et al. |
| 2008/0070807 | A1 | 3/2008 | Munoz et al. |
| 2008/0070808 | A1 | 3/2008 | Munoz et al. |
| 2008/0110624 | A1 | 5/2008 | Nguyen et al. |
| 2008/0139411 | A1 | 6/2008 | Harris et al. |
| 2008/0173448 | A1 | 7/2008 | Nguyen et al. |
| 2008/0196897 | A1 | 8/2008 | Nguyen |
| 2010/0276152 | A1 | 11/2010 | De Wolf et al. |

FOREIGN PATENT DOCUMENTS

| | | |
|---|---|---|
| EP | 0 383 337 A2 | 8/1990 |
| EP | 0 896 122 A2 | 2/1999 |
| EP | 1 033 378 A1 | 9/2000 |
| EP | 1 193 365 A1 | 4/2002 |
| EP | 1 312 753 A1 | 5/2003 |
| GB | 2 221 940 A | 2/1990 |
| GB | 2 335 428 A | 9/1999 |
| WO | WO 93/15164 | 8/1993 |
| WO | WO 99/49183 | 9/1999 |
| WO | WO 99/50530 | 10/1999 |
| WO | WO 00/78890 | 12/2000 |
| WO | WO 02/097236 A1 | 12/2002 |
| WO | WO 03/056130 | 7/2003 |
| WO | WO 2004/022667 | 3/2004 |
| WO | WO 2004/022667 A1 | 3/2004 |
| WO | WO 2004/094781 | 11/2004 |
| WO | WO 2004/101706 A1 | 11/2004 |

OTHER PUBLICATIONS

U.S. Appl. No. 10/780,995, filed Feb. 18, 2004, Eoff, et al.
U.S. Appl. No. 10/806,894, filed Mar. 23, 2004, Eoff, et al.
U.S. Appl. No. 10/825,001, filed Apr. 15, 2004, Eoff, et al.
U.S. Appl. No. 10/872,997, filed Jun. 21, 2004, Eoff, et al.
U.S. Appl. No. 10/881,198, filed Jun. 29, 2004, Dalrymple, et al.
U.S. Appl. No. 10/893,210, filed Jul. 16, 2004, Eoff, et al.
U.S. Appl. No. 11/102,062, filed Apr. 8, 2005, Sierra, et al.
Botermans, C. Wouter, et al, *Relative Permeability Modifiers: Myth or Reality?*, SPE eLibrary Paper No. 68973, 2001, Society of Petroleum Engineers, Inc., presented at SPE European Formation Damage Conference, The Hague, The Netherlands, May 21-22, pp. 1-2, printed from website @ http://speonline.spe.org/cdi-bin/viewpaper.cgi?paper=00068973.pdf.

Eoff, Larry, et al, *Structure and Process Optimization for the Use of a Polymeric Relative-Permeability Modifier in Conformance Control*, SPE eLibrary Paper No. 64985, 2001, Society of Petroleum Engineers, Inc., presented at SPE International Symposium on Oilfield Chemistry, Houston, TX, Feb. 13-16, pp. 1-2, printed from website @ http://speonline.spe.org/cgi-bin/viewpaper.cgi?paper=00064985.pdf.
Inikori, Solomon Ovueferaye, *Numerical Study of Water Coning Control with Downhole Water Sink (DWS) Well Completions in Vertical and Horizontal Wells*, A Dissertation, Aug. 2002, Title Page, Contents, Abstract and pp. 17-18, Submitted to the Graduate Faculty of the Louisiana State University and Agricultural and Mechanical College, The Department of Petroleum Engineering.
Zhou, Z. J., et al, *Controlling Formation Damage Using Clay Stabilizers: A Review*, Paper 95-71, The Petroleum Society of CIM, 1995, presented at the 46$^{th}$ Annual Technical Meeting of the Petroleum Society of CIM in Banff, Alberta, Canada, May 14-17.
Halliburton, 2001 Press Releases, *Halliburton Technology Uses Revolutionary Polymer System to Control Unwanted Water Production*, 2002 Halliburton, pp. 1-2, printed from website @ www.halliburton.com/news/archive/2001/esgnws_053101.jsp?printMe.
Halliburton, 2001 Press Releases, *First Halliburton H2Zero™ Conformance Solution Job Performed for a Producing Well in Egypt*, 2002 Halliburton, pp. 1-2, printed from website @ www.halliburton.com/news/archive/2001/esgnws_111901.jsp.
Halliburton, 2001 Press Releases, *Halliburton Performs First H2Zero™ Conformance Solution Job in North America*, 2002 Halliburton, pp. 1-2, printed from website @ www.halliburton.com/news/archive/2001/esgnws_082201.jsp.
BJ Services Company, *Aquacon, Product Information*, Aug. 1, 2001, pp. 1-2.
BJ Services Company, *Aquatrol I, Product Information*, Dec. 14, 2000, pp. 1-2.
Proett, et al., *Advanced Dual Probe Formation Tester with Transient, Harmonic, and Pulsed Time-Delay Testing Methods Determines Permeability, Skin, and Anisotropy*, SPE 64650, 2000, Society of Petroleum Engineers Inc., presented at the SPE International Oil and Gas Conference and Exhibition in China held in Beijing, China, Nov. 7-10, 2000, printed from website @ http://speonline.spe.org.
Proett, et al., *Advanced Permeability and Anisotropy Measurements While Testing and Sampling in Real-time Using a Dual Probe Formation Tester*, SPE 62919, 2000, Society of Petroleum Engineers Inc., presented at the 2000 SPE Annual Technical Conference and Exhibition held in Dallas, Texas, Oct. 1-4, 2000, printed from website @ http://speonline.spe.org.
Bai, et al., *Improved Determination of Stress-Dependent Permeability for Anisotropic Formations*, SPE/ISRM 78188, 2000, Society of Petroleum Engineers Inc., presented at the SPE/ISRM Rock Mechanics Conference held in Irving, Texas, Oct. 20-23, 2002, printed from website @ http://speonline.spe.org.
Parker, et al., *Laser Drilling: Effects of Beam Application Methods on Improving Rock Removal*, SPE 84353, 2003, Society of Petroleum Engineers Inc., presented at the SPE Annual Technical Conference and Exhibition held in Denver, Colorado, Oct. 5-8, 2003, printed from website @ http://speonline.spe.org.
Xu, et al., *Modeling of Laser Spallation Drilling of Rocks for Gas— and Oilwell Drilling*, SPE 95746, 2005, Society of Petroleum Engineers Inc., presented at the 2005 SPE Annual Technical Conference and Exhibition held in Dallas, Texas, Oct. 9-12, 2005, printed from website @ http://speonline.spe.org.
Batarseh, et al., *Well Perforation Using High-Power Lasers*, SPE 84418, 2003, Society of Petroleum Engineers Inc., presented at the SPE Annual Technical Conference and Exhibition held in Denver, Colorado, Oct. 5-8, 2003, printed from website @ http://speonline.spe.org.
Gahan, et al., *Analysis of Efficient High-Power Fiber Lasers for Well Perforation*, SPE 90661, 2004, Society of Petroleum Engineers Inc., presented at the SPE Annual Technical Conference and Exhibition held in Houston, Texas, Sep. 26-29, 2004, printed from website @ http://speonline.spe.org.
Gahan, et al., *Effect of Downhole Pressure Conditions on High-Power Laser Perforation*, SPE 97093, 2005, Society of Petroleum Engineers, presented at the 2005 SPE Annual Technical Conference and Exhibition held in Dallas, Texas, Oct. 9-12, 2005, printed from website @ http://speonline.spe.org.
U.S. Appl. No. 12/080,647, filed Apr. 4, 2008.
Office Action dated Feb. 1, 2008 from U.S. Appl. No. 10/440,337.
Office Action dated May 22, 2008 from U.S. Appl. No. 11/102,062.
Office action dated Nov. 16, 2007 from U.S. Appl. No. 10/760,443.
Office action dated Aug. 8, 2007 from U.S. Appl. No. 10/760,443.
Office action dated Feb. 21, 2007 from U.S. Appl. No. 10/760,443.
Office action dated Oct. 6, 2006 from U.S. Appl. No. 10/760,443.
Office action dated Mar. 23, 2006 from U.S. Appl. No. 10/760,443.
Office action dated Dec. 28, 2007 from U.S. Appl. No. 10/806,894.
Office action dated Jul. 12, 2007 from U.S. Appl. No. 10/806,894.
Office action dated Apr. 9, 2007 from U.S. Appl. No. 10/806,894.
Office action dated Jan. 3, 2007 from U.S. Appl. No. 10/806,894.
Office action dated Jul. 3, 2006 from U.S. Appl. No. 10/806,894.
Notice of allowance dated Jan. 28, 2008 from U.S. Appl. No. 11/102,062.
Office action dated Jun. 27, 2007 from U.S. Appl. No. 11/102,062.
Office action dated May 1, 2007 from U.S. Appl. No. 11/122,836.
Office action dated Nov. 14, 2007 from U.S. Appl. No. 11/122,836.
Office action dated Nov. 15, 2006 from U.S. Appl. No. 10/440,337.
Office action dated May 3, 2006 from U.S. Appl. No. 10/440,337.
Notice of allowance dated Mar. 23, 2006 from U.S. Appl. No. 10/236,722.
Office action dated Sep. 28, 2005 from U.S. Appl. No. 10/236,722.
Office action dated Jul. 5, 2005 from U.S. Appl. No. 10/236,722.
Office action dated Apr. 19, 2005 from U.S. Appl. No. 10/236,722.
Office action dated Oct. 20, 2004 from U.S. Appl. No. 10/236,722.
Notice of allowance dated Mar. 23, 2006 from U.S. Appl. No. 10/612,271.
Notice of allowance dated Jul. 18, 2006 from U.S. Appl. No. 10/825,001.
Office action dated Jan. 6, 2006 from U.S. Appl. No. 10/825,001.
Notice of allowance dated Aug. 17, 2006 from U.S. Appl. No. 10/881,198.
Notice of allowance dated May 25, 2006 from U.S. Appl. No. 10/881,198.
Notice of allowance dated Mar. 5, 2007 from U.S. Appl. No. 10/893,210.
Notice of allowance dated Feb. 27, 2007 from U.S. Appl. No. 10/893,210.
Office action dated Sep. 12, 2006 from U.S. Appl. No. 10/893,210.
Office action dated Jan. 14, 2008 from U.S. Appl. No. 11/471,148.
Office action dated Nov. 2, 2007 from U.S. Appl. No. 11/471,148.
Office action dated Sep. 20, 2007 from U.S. Appl. No. 11/471,148.
Office action dated Apr. 5, 2007 from U.S. Appl. No. 11/471,148.
Office action dated Jan. 14, 2008 from U.S. Appl. No. 11/471,738.
Office action dated Nov. 2, 2007 from U.S. Appl. No. 11/471,738.
Office action dated Sep. 20, 2007 from U.S. Appl. No. 11/471,738.
Office action dated Apr. 6, 2007 from U.S. Appl. No. 11/471,738.
Office action dated Sep. 24, 2007 from U.S. Appl. No. 10/862,132.
Office action dated Jul. 12, 2007 from U.S. Appl. No. 10/862,132.
Office action dated Jan. 22, 2007 from U.S. Appl. No. 10/862,132.
Office action dated Jul. 28, 2006 from U.S. Appl. No. 10/862,132.
Office Action dated Jun. 13, 2008 from U.S. Appl. No. 10/806,894.
Office Action dated Mar. 26, 2008 from U.S. Appl. No. 10/862,132.
Office Action dated Mar. 26, 2008 from U.S. Appl. No. 11/360,215.
Office Action dated Apr. 3, 2008 from U.S. Appl. No. 10/760,443.
Foreign Communication from a Related Counterpart Application dated Oct. 9, 2007.
International Search Report and Written Opinion for Application No. PCT/GB2007/002633, Jul. 12, 2007.
Office Action for U.S. Appl. No. 11/360,215 dated Sep. 17, 2008.
Notice of Allowance and Notice of Allowability for U.S. Appl. No. 11/471,738, dated May 28, 2009.
Office Action mailed Oct. 31, 2008, for U.S. Appl. No. 10/862,132.
Office Action mailed Nov. 18, 2008, for U.S. Appl. No. 11/122,836.
Office Action mailed Nov. 17, 2008, for U.S. Appl. No. 11/471,148.
Office Action mailed Nov. 18, 2008, for U.S. Appl. No. 11/471,738.
Office Action for U.S. Appl. No. 10/862,132, dated Apr. 28, 2009.
Office Action for U.S. Appl. No. 11/360,215, dated Apr. 28, 2009.
Office Action for U.S. Appl. No. 11/485,199, dated Apr. 28, 2009.
Office Action from U.S. Appl. No. 11/485,199 mailed Sep. 24, 2008.
Office Action from U.S. Appl. No. 10/440,337 mailed Sep. 25, 2008.
Office Action from U.S. Appl. No. 11/102,062 mailed Sep. 23, 2008.
Office Action for U.S. Appl. No. 10/806,894, mailed Dec. 17, 2008.
Office Action for U.S. Appl. No. 10/760,443, mailed Dec. 23, 2008.
Office Action for U.S. Appl. No. 10/806,894, dated Jul. 10, 2009.
Office Action for U.S. Appl. No. 11/102,062, dated Nov. 12, 2009.
Office Action for U.S. Appl. No. 11/485,199, dated Nov. 18, 2009.
Office Action for U.S. Appl. No. 11/360,215, dated Dec. 7, 2009.
Office Action for U.S. Appl. No. 10/862,132 dated Dec. 30, 2009.
Notice of Allowance for U.S. Appl. No. 10/760,443 dated Feb. 8, 2010.
Office Action for U.S. Appl. No. 11/122,836 dated Feb. 22, 2010.
Office Action for U.S. Appl. No. 11/102,062 dated Feb. 24, 2010.
Office Action for U.S. Appl. No. 10/806,894 dated Apr. 1, 2010.
Notice of Allowance for U.S. Appl. No. 10/862,132 dated Apr. 1, 2010.
Office Action for U.S. Appl. No. 11/360,215 dated Jun. 9, 2010.
Office Action for U.S. Appl. No. 11/102,062 dated Jun. 29, 2010.
Office Action for U.S. Appl. No. 11/122,836 dated Jul. 22, 2010.
Office Action for U.S. Appl. No. 12/533,150 dated Jan. 7, 2011.
Office Action for U.S. Appl. No. 10/806,894 dated Oct. 5, 2010.
Office Action for U.S. Appl. No. 11/485,199 dated Sep. 8, 2010.
Office Action for U.S. Appl. No. 11/360,215 dated Sep. 8, 2010.
Office Action for U.S. Appl. No. 11/102,062 dated Nov. 18, 2010.
Office Action for U.S. Appl. No. 11/122,836 dated Apr. 29, 2011.
Office Action for U.S. Appl. No. 11/360,215 dated Feb. 8, 2011.
Office Action for U.S. Appl. No. 11/485,199 dated Feb. 8, 2011.
Office Action for U.S. Appl. No. 10/806,894 dated Mar. 17, 2011.
Office Action for U.S. Appl. No. 11/102,062 dated Mar. 23, 2011.
Office Action for U.S. Appl. No. 11/102,062 dated Jun. 29, 2011.
Office Action for U.S. Appl. No. 11/360,215 dated Jul. 5, 2011.
Office Action for U.S. Appl. No. 11/485,199 dated Jul. 27, 2011.
Office Action for U.S. Appl. No. 12/533,150 dated Jun. 10, 2011.

* cited by examiner

METHODS USEFUL FOR CONTROLLING FLUID LOSS DURING SAND CONTROL OPERATIONS

CROSS-REFERENCE TO RELATED APPLICATIONS

This application is a continuation-in-part of U.S. application Ser. No. 11/360,215 filed on Feb. 22, 2006, which is a continuation-in-part of U.S. application Ser. No. 11/102,062 filed on Apr. 8, 2005, which is a continuation-in-part of U.S. application Ser. No. 10/881,198 filed on Jun. 29, 2004 now U.S. Pat. No 7,117,942 and U.S. patent application Ser. No. 10/760,443 filed on Jan. 20, 2004, which is a continuation-in-part of U.S. application Ser. No. 10/440,337 filed on May 16, 2003 now abandoned, and U.S. application Ser. No. 10/612,271 filed on Jul. 2, 2003 now U.S. Pat. No. 7,182,136, the entire disclosures of which are incorporated by reference.

BACKGROUND

The present invention relates to methods useful during sand control operations and, more particularly, to using water-soluble relative permeability modifiers that may be useful for controlling fluid loss during sand control operations.

Hydrocarbon wells are often located in sections of subterranean formations that contain unconsolidated formation particulates that may migrate out of the subterranean formation with the oil, gas, water, and/or other fluids produced by the wells. The presence of formation particulates, such as formation sand, in produced fluids is undesirable in that the formation particulates may abrade pumping and other producing equipment and reduce the fluid production capabilities of the producing zones. As referred to herein, "unconsolidated formation particulates" include loose formation particulates and those wherein the bonded formation particulates cannot withstand the forces produced by the production of fluids therethrough.

Different techniques of controlling formation particulates have been developed and are commonly referred to as "sand control operations." One common technique for performing a sand control operation is gravel packing. Gravel packing operations may be performed in horizontal, vertical, inclined, or otherwise formed portions of wells. Gravel packing operations typically use viscosified carrier fluids to suspend gravel particulates for delivery to a desired area in a well bore, e.g., near sections of a subterranean formation that contains unconsolidated formation particulates. In some horizontal wells, no viscosifying agents may be placed into the carrier fluid and high pumping rates may be used to deliver the gravel particulates to the desired location. Gravel particulates used during a gravel pack operation may be of a specific size designed to prevent the passage of formation particulates. One common type of gravel packing operation involves placing a gravel pack screen in the well bore and packing the annulus between the screen and the well bore with gravel particulates. Once in place, the gravel particulates act, inter alia, to prevent the formation particulates from occluding the screen or migrating with the produced fluids, and the screen acts, inter alia, to prevent the placed gravel particulates from entering the production tubing. After the gravel particulates have been placed in the desired location, the carrier fluid leaks off into the formation, inter alia, to allow the gravel particulates to settle into a gravel pack. Subsequently, the viscosity of the carrier fluid may be reduced (if needed), the well may be put back into production, and the carrier fluid may be produced back from the well. Other types of gravel packing operations may involve the use of gravel particulates coated with a resin or tackifying composition, wherein the gravel particulates may form hard, permeable masses therein to reduce the migration of formation particulates. In some instances, the processes of fracturing and gravel packing may be combined into a single treatment to provide a stimulated production and an annular gravel pack to prevent the migration of formation particulates. Such treatments are often referred to as "frac pack" operations.

A problem often encountered during sand control operations is excessive fluid loss into the formation. For example, during gravel pack operations and frac pack operations excessive fluid loss into the formation may cause a premature sandout to occur. As used herein, "premature sandout" refers to an undesired agglomeration of gravel particulates that can block the progress of the additional gravel particulates necessary to form the desired gravel pack. To prevent a premature sandout from occurring, fluid loss control additives commonly are included in the carrier fluids. Examples of commonly used fluid loss control additives include, but are not limited to, viscosifying agents, such as hydroxyethylcellulose and xanthan. Additional fluid loss control may be provided by crosslinking the gelling agent or by including sized solids in the carrier fluid, such as calcium carbonate.

A variety of service tools may be used during sand control operations, whereby removal of these service tools from the production packer after the sand control operation is necessitated. To prevent fluid loss into the formation during removal of these service tools, mechanical devices, such as flapper valves, may be used. In some instances, however, these mechanical devices may fail or otherwise cannot be used. In these instances, chemical fluid loss control pills may be used as supplements to the mechanical devices or as contingencies in case of their failure.

Conventional chemical fluid loss control pills may be characterized as either solids-containing pills or solids-free pills. Examples of solids-containing pills include sized-salt pills and sized-carbonate pills. These solids-containing pills often are not optimized for the particular downhole hardware and conditions that may be encountered. For instance, the particle sizes of the solids may not be optimized for particular gravel pack screen openings and, as a result, may invade into the interior of the gravel pack screen, which may greatly increase the difficulty of removal by subsequent remedial treatments. Additionally, high-solids loading in the pills, in conjunction with the large volumes of these pills needed to control fluid losses, may lead to the plugging of the interior and exterior of the gravel pack screen, which also may greatly increase the complexity of subsequent clean up. Furthermore, high loading of starches and biopolymers in the sized salt pills may add to the difficulty of cleanup either by flowback or remedial treatments. Solids-free fluid loss control pills commonly comprise crosslinked polymers that may not be effective without some invasion into the gravel pack screen and formation matrix. These pills typically require large volumes to control fluid loss and remedial treatments to remove.

Once fluid loss control may be no longer required, remedial treatments may be required to remove the previously placed pills, inter alia, so that the wells may be placed into production. For example, a chemical breaker, such as an acid, oxidizer, or enzyme may be used to either dissolve the solids or reduce the viscosity of the pill. In many instances, however, use of a chemical breaker to remove the pill from inside the screen may be either ineffective or not a viable economic option. Furthermore, the chemical breakers may be corrosive to the gravel pack screens and other downhole tools. Additionally, as the chemical breakers leak off into the formation, they may carry undissolved fines that may plug and/or damage the formation or may produce undesirable reactions with the formation matrix.

SUMMARY

The present invention relates to methods useful during sand control operations and, more particularly, to using water-soluble relative permeability modifiers that may be useful for controlling fluid loss during sand control operations.

In one embodiment, the present invention provides a method comprising providing a carrier fluid comprising an aqueous-based component, a water-soluble relative permeability modifier, and gravel particulates wherein the water-soluble relative permeability modifier suspends at least a portion of the gravel particulates; and introducing the carrier fluid into a well bore penetrating a subterranean formation, such that the gravel particulates form a gravel pack near the well bore.

In another embodiment, the present invention provides a method comprising providing a carrier fluid comprising an aqueous-based component, a water-soluble relative permeability modifier, and gravel particulates wherein the carrier fluid is substantially free of a viscosifying agent; allowing the water-soluble relative permeability modifier to suspend at least a portion of the gravel particulates; and introducing the carrier fluid into a well bore penetrating a subterranean formation, such that the gravel particulates form a gravel pack near the well bore.

Other and further features and advantages of the present invention will be readily apparent to those skilled in the art upon a reading of the detailed description that follows.

DETAILED DESCRIPTION

The present invention relates to methods useful during sand control operations and, more particularly, to using water-soluble relative permeability modifiers that may be useful for controlling fluid loss during sand control operations. As used herein, "water-soluble" refers to at least 0.01 weight percent soluble in distilled water. The methods and compositions of the present invention may be utilized in horizontal, vertical, inclined, or otherwise formed portions of wells.

The treatment fluids of the present invention generally comprise an aqueous-based component and a water-soluble relative permeability modifier. A variety of additives suitable for use in the chosen operation may be included in the treatment fluids as desired. In some embodiments, the treatment fluids may be carrier fluids used in gravel pack or frac pack operations. In other embodiments, the treatment fluids may be pills that are placed into the well bore either prior to or after a gravel pack or a frac pack operation, inter alia, to provide fluid loss control.

The aqueous-based component of the treatment fluids of the present invention may include fresh water, saltwater, brine (e.g., saturated saltwater), or seawater. Generally, the water may be from any source provided that it does not contain components that may adversely affect other components in the treatment fluid.

Generally, the relative permeability modifiers useful in the present invention may be any relative permeability modifier that is suitable for use in subterranean operations. After introducing the relative permeability modifier into a portion of the subterranean formation, it is believed that the relative permeability modifier attaches to surfaces within the porosity of the subterranean formation, so as to reduce the permeability of the portion of the subterranean formation to aqueous fluids without substantially changing its permeability to hydrocarbons. Additionally, in some embodiments, the relative permeability modifier may also facilitate suspension of gravel particulates in a carrier fluid.

Examples of suitable relative permeability modifiers include water-soluble polymers with or without hydrophobic or hydrophilic modification. A water-soluble polymer with hydrophobic modification is referred to herein as a "hydrophobically modified polymer." As used herein, the term "hydrophobic modification," or "hydrophobically modified," refers to the incorporation into the hydrophilic polymer structure of hydrophobic groups, wherein the alkyl chain length is from about 4 to about 22 carbons. A water-soluble polymer with hydrophilic modification is referred to herein as a "hydrophilically modified polymer." As used herein, the term "hydrophilic modification," or "hydrophilically modified," refers to the incorporation into the hydrophilic polymer structure of hydrophilic groups, such as to introduce branching or to increase the degree of branching in the hydrophilic polymer. Combinations of hydrophobically modified polymers, hydrophilically modified polymers, and water-soluble polymers without hydrophobic or hydrophilic modification may be included in the relative modifier fluids of the present invention.

The hydrophobically modified polymers useful in the present invention typically have molecular weights in the range of from about 100,000 to about 10,000,000. While these hydrophobically modified polymers have hydrophobic groups incorporated into the hydrophilic polymer structure, they should remain water-soluble. In some embodiments, a mole ratio of a hydrophilic monomer to the hydrophobic compound in the hydrophobically modified polymer is in the range of from about 99.98:0.02 to about 90:10, wherein the hydrophilic monomer is a calculated amount present in the hydrophilic polymer. In certain embodiments, the hydrophobically modified polymers may comprise a polymer backbone, the polymer backbone comprising polar heteroatoms. Generally, the polar heteroatoms present within the polymer backbone of the hydrophobically modified polymers include, but are not limited to, oxygen, nitrogen, sulfur, or phosphorous.

The hydrophobically modified polymers may be synthesized using any suitable method. In one example, the hydrophobically modified polymers may be a reaction product of a hydrophilic polymer and a hydrophobic compound. In another example, the hydrophobically modified polymers may be prepared from a polymerization reaction comprising a hydrophilic monomer and a hydrophobically modified hydrophilic monomer. Those of ordinary skill in the art, with the benefit of this disclosure, will be able to determine other suitable methods for the synthesis of suitable hydrophobically modified polymers.

In certain embodiments, suitable hydrophobically modified polymers may be synthesized by the hydrophobic modification of a hydrophilic polymer. The hydrophilic polymers suitable for forming hydrophobically modified polymers of the present invention should be capable of reacting with hydrophobic compounds. Suitable hydrophilic polymers include, homo-, co-, or terpolymers such as, but not limited to, polyacrylamides, polyvinylamines, poly(vinylamines/vinyl alcohols), alkyl acrylate polymers in general, and derivatives thereof. Additional examples of alkyl acrylate polymers include, but are not limited to, polydimethylaminoethyl methacrylate, polydimethylaminopropyl methacrylamide, poly(acrylamide/dimethylaminoethyl methacrylate), poly (methacrylic acid/dimethylaminoethyl methacrylate), poly (2-acrylamido-2-methyl propane sulfonic acid/dimethylaminoethyl methacrylate), poly(acrylamide/ dimethylaminopropyl methacrylamide), poly(acrylic acid/ dimethylaminopropyl methacrylamide), and poly (methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophobic compounds. In some embodiments, the hydrophilic polymers comprise dialkyl amino pendant groups. In some embodiments, the hydrophilic polymers comprise a dimethyl amino pendant group and a monomer comprising dimethylaminoethyl methacrylate or dimethylaminopropyl methacrylamide. In certain embodiments of the present invention, the hydrophilic polymers comprise a polymer backbone, the polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, and tapioca, and the like, with the reaction product of epichlorohydrin and trialkylamine.

The hydrophobic compounds that are capable of reacting with the hydrophilic polymers of the present invention include, but are not limited to, alkyl halides, sulfonates, sulfates, organic acids, and organic acid derivatives. Examples of suitable organic acids and derivatives thereof include, but are not limited to, octenyl succinic acid; dodecenyl succinic acid; and anhydrides, esters, imides, and amides of octenyl succinic acid or dodecenyl succinic acid. In certain embodiments, the hydrophobic compounds may have an alkyl chain length of from about 4 to about 22 carbons. In another embodiment, the hydrophobic compounds may have an alkyl chain length of from about 7 to about 22 carbons. In another embodiment, the hydrophobic compounds may have an alkyl chain length of from about 12 to about 18 carbons. For example, where the hydrophobic compound is an alkyl halide, the reaction between the hydrophobic compound and hydrophilic polymer may result in the quaternization of at least some of the hydrophilic polymer amino groups with an alkyl halide, wherein the alkyl chain length is from about 4 to about 22 carbons.

As previously mentioned, in certain embodiments, suitable hydrophobically modified polymers also may be prepared from a polymerization reaction comprising a hydrophilic monomer and a hydrophobically modified hydrophilic monomer. Examples of suitable methods of their preparation are described in U.S. Pat. No. 6,476,169, the relevant disclosure of which is incorporated herein by reference. The hydrophobically modified polymers synthesized from the polymerization reactions may have estimated molecular weights in the range of from about 100,000 to about 10,000,000 and mole ratios of the hydrophilic monomer(s) to the hydrophobically modified hydrophilic monomer(s) in the range of from about 99.98:0.02 to about 90:10.

A variety of hydrophilic monomers may be used to form the hydrophobically modified polymers useful in the present invention. Examples of suitable hydrophilic monomers include, but are not limited to acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide, and quaternary salt derivatives of acrylic acid.

A variety of hydrophobically modified hydrophilic monomers also may be used to form the hydrophobically modified polymers useful in the present invention. Examples of suitable hydrophobically modified hydrophilic monomers include, but are not limited to, alkyl acrylates, alkyl methacrylates, alkyl acrylamides, alkyl methacrylamides alkyl dimethylammoniumethyl methacrylate halides, and alkyl dimethylammoniumpropyl methacrylamide halides, wherein the alkyl groups have from about 4 to about 22 carbon atoms. In another embodiment, the alkyl groups have from about 7 to about 22 carbons. In another embodiment, the alkyl groups have from about 12 to about 18 carbons. In certain embodiments, the hydrophobically modified hydrophilic monomer comprises octadecyldimethylammoniumethyl methacrylate bromide, hexadecyldimethylammoniumethyl methacrylate bromide, hexadecyldimethylammoniumpropyl methacrylamide bromide, 2-ethylhexyl methacrylate, or hexadecyl methacrylamide.

Suitable hydrophobically modified polymers that may be formed from the above-described reactions include, but are not limited to, acrylamide/octadecyldimethylammoniumethyl methacrylate bromide copolymer, dimethylaminoethyl methacrylate/vinyl pyrrolidone/hexadecyldimethylammoniumethyl methacrylate bromide terpolymer, and acrylamide/2-acrylamido-2-methyl propane sulfonic acid/2-ethylhexyl methacrylate terpolymer. Another suitable hydrophobically modified polymer formed from the above-described reaction is an amino methacrylate/alkyl amino methacrylate copolymer. A suitable dimethlyaminoethyl methacrylate/alkyl-dimethylammoniumethyl methacrylate copolymer is a dimethylaminoethyl methacrylate/hexadecyl-dimethylammoniumethyl methacrylate copolymer. As previously discussed, these copolymers may be formed by reactions with a variety of alkyl halides. For example, in some embodiments, the hydrophobically modified polymer may be a dimethylaminoethyl methacrylate/hexadecyl-dimethylammoniumethyl methacrylate bromide copolymer.

In another embodiment of the present invention, the relative permeability modifier may comprise a water-soluble hydrophilically modified polymer. The hydrophilically modified polymers of the present invention typically have molecular weights in the range of from about 100,000 to about 10,000,000. In certain embodiments, the hydrophilically modified polymers comprise a polymer backbone, the polymer backbone comprising polar heteroatoms. Generally, the polar heteroatoms present within the polymer backbone of the hydrophilically modified polymers include, but are not limited to, oxygen, nitrogen, sulfur, or phosphorous.

The hydrophilically modified polymers may be synthesized using any suitable method. In one example, the hydrophilically modified polymers may be a reaction product of a hydrophilic polymer and a hydrophilic compound. Those of ordinary skill in the art, with the benefit of this disclosure, will be able to determine other suitable methods for the preparation of suitable hydrophilically modified polymers.

In certain embodiments, suitable hydrophilically modified polymers may be formed by additional hydrophilic modification, for example, to introduce branching or to increase the degree of branching, of a hydrophilic polymer. The hydrophilic polymers suitable for forming the hydrophilically modified polymers used in the present invention should be capable of reacting with hydrophilic compounds. In certain embodiments, suitable hydrophilic polymers include, homo-, co-, or terpolymers, such as, but not limited to, polyacrylamides, polyvinylamines, poly(vinylamines/vinyl alcohols), and alkyl acrylate polymers in general. Additional examples of alkyl acrylate polymers include, but are not limited to, polydimethylaminoethyl methacrylate, polydimethylaminopropyl methacrylamide, poly(acrylamide/dimethylaminoethyl methacrylate), poly(methacrylic acid/dimethylaminoethyl methacrylate), poly(2-acrylamido-2-methyl propane sulfonic acid/dimethylaminoethyl methacrylate), poly(acrylamide/dimethylaminopropyl methacrylamide), poly(acrylic acid/dimethylaminopropyl methacrylamide), and poly(methacrylic acid/dimethylaminopropyl methacrylamide). In certain embodiments, the hydrophilic polymers comprise a polymer backbone and reactive amino groups in the polymer backbone or as pendant groups, the reactive amino groups capable of reacting with hydrophilic compounds. In some embodiments, the hydrophilic polymers comprise dialkyl amino pendant groups. In some embodiments, the hydrophilic polymers comprise a dimethyl amino pendant group and at least one monomer comprising dimethylaminoethyl methacrylate or dimethylaminopropyl methacrylamide. In other embodiments, the hydrophilic polymers comprise a polymer backbone comprising polar heteroatoms, wherein the polar heteroatoms present within the polymer backbone of the hydrophilic polymers include, but are not limited to, oxygen, nitrogen, sulfur, or phosphorous. Suitable hydrophilic polymers that comprise polar heteroatoms within the polymer backbone include homo-, co-, or terpolymers, such as, but not limited to, celluloses, chitosans, polyamides, polyetheramines, polyethyleneimines, polyhydroxyetheramines, polylysines, polysulfones, gums, starches, and derivatives thereof. In one embodiment, the starch is a cationic starch. A suitable cationic starch may be formed by reacting a starch, such as corn, maize, waxy maize, potato, tapioca, and the like, with the reaction product of epichlorohydrin and trialkylamine.

The hydrophilic compounds suitable for reaction with the hydrophilic polymers include polyethers that comprise halogens, sulfonates, sulfates, organic acids, and organic acid derivatives. Examples of suitable polyethers include, but are not limited to, polyethylene oxides, polypropylene oxides, and polybutylene oxides, and copolymers, terpolymers, and mixtures thereof. In some embodiments, the polyether comprises an epichlorohydrin-terminated polyethylene oxide methyl ether.

The hydrophilically modified polymers formed from the reaction of a hydrophilic polymer with a hydrophilic compound may have estimated molecular weights in the range of from about 100,000 to about 10,000,000 and may have weight ratios of the hydrophilic polymers to the polyethers in the range of from about 1:1 to about 10:1. Suitable hydrophilically modified polymers having molecular weights and weight ratios in the ranges set forth above include, but are not limited to, the reaction product of polydimethylaminoethyl methacrylate and epichlorohydrin-terminated polyethyleneoxide methyl ether; the reaction product of polydimethylaminopropyl methacrylamide and epichlorohydrin-terminated polyethyleneoxide methyl ether; and the reaction product of poly(acrylamide/dimethylaminopropyl methacrylamide) and epichlorohydrin-terminated polyethyleneoxide methyl ether. In some embodiments, the hydrophilically modified polymer comprises the reaction product of a polydimethylaminoethyl methacrylate and epichlorohydrin-terminated polyethyleneoxide methyl ether having a weight ratio of polydimethylaminoethyl methacrylate to epichlorohydrin-terminated polyethyleneoxide methyl ether of about 3:1.

Sufficient concentrations of a suitable relative permeability modifier should be present in the treatment fluids of the present invention to provide the desired degree of fluid loss control, gravel suspension, and/or viscosity enhancement. In some embodiments, the relative permeability modifier should be included in the treatment fluids of the present invention in an amount in the range of from about 0.02% to about 10% by weight of the treatment fluid. In other embodiments, the relative permeability modifier should be present in the treatment fluids of the present invention in an amount in the range of from about 0.05% to about 1.0% by weight of the treatment fluid. In certain embodiments, the relative permeability modifier may be provided in a concentrated aqueous solution prior to its combination with the other components necessary to form the treatment fluids of the present invention.

In other embodiments of the present invention, the relative permeability modifiers may comprise a water-soluble polymer without hydrophobic or hydrophilic modification. Examples of suitable water-soluble polymers include, but are not limited to, homo-, co-, and terpolymers of acrylamide, 2-acrylamido-2-methyl propane sulfonic acid, N,N-dimethylacrylamide, vinyl pyrrolidone, dimethylaminoethyl methacrylate, acrylic acid, dimethylaminopropylmethacrylamide, vinyl amine, vinyl acetate, trimethylammoniumethyl methacrylate chloride, methacrylamide, hydroxyethyl acrylate, vinyl sulfonic acid, vinyl phosphonic acid, methacrylic acid, vinyl caprolactam, N-vinylformamide, N,N-diallylacetamide, dimethyldiallyl ammonium halide, itaconic acid, styrene sulfonic acid, methacrylamidoethyltrimethyl ammonium halide, quaternary salt derivatives of acrylamide and quaternary salt derivatives of acrylic acid.

The treatment fluids of the present invention optionally may comprise gravel particulates suitable for use in subterranean applications. Suitable gravel particulates include, but are not limited to, gravel, natural sand, quartz sand, particulate garnet, glass, ground walnut hulls, nylon pellets, aluminum pellets, bauxite, ceramics, and polymeric materials, and combinations thereof. One having ordinary skill in the art, with the benefit of this disclosure, will recognize the particulate type, size, and amount to use in conjunction with the treatment fluids of the present invention to achieve a desired result. In certain embodiments, the gravel particulates used may be included in the treatment fluids to form a gravel pack downhole. In some embodiments, the gravel particulates may be coated with a resin or tackifying composition, wherein the gravel particulates may form hard, permeable masses in the formation, inter alia, to reduce the migration of formation particulates.

Additional additives may be added to the treatment fluids of the present invention as deemed appropriate for a particular application by one skilled in the art with the benefit of this disclosure. Examples of such additives include, but are not limited to, weighting agents, surfactants, scale inhibitors, antifoaming agents, bactericides, salts, foaming agents, conventional fluid loss control additives, gel breakers, shale swelling inhibitors, and combinations thereof.

The treatment fluids of the present invention may be used in a variety of sand control operations where it is desirable to provide fluid loss control, gravel particulate suspension, and/ or viscosity enhancement. In some embodiments, where the treatment fluids of the present invention are used with gravel packing and frac packing operations, carrier fluids that comprise an aqueous component, a water-soluble relative permeability modifier, and gravel particulates may be introduced into a well bore so as to create a gravel pack. In certain embodiments, the carrier fluids of the present invention further may comprise a viscosifying agent. Examples of suitable viscosifying agents include, but are not limited to, xanthan, guar or guar derivatives, cellulose derivatives, a viscoelastic surfactant, etc. In other embodiments, no viscosifying agents may be included in the carrier fluids of the present invention and the relative permeability modifier may act to suspend the gravel particulates. In these embodiments, where no viscosifying agent is included in the carrier fluid, the pumping rates of the carrier fluid should be sufficient to place the gravel particulates into the desired location for the gravel pack without the use of viscosifying agents. In one embodiment, the carrier fluid does not comprise a viscosifying agent where the well bore is horizontal. Among other things, the water-soluble relative permeability modifiers present in the carrier fluid may act to provide gravel particulate suspension and/or reduce fluid loss from the carrier fluid into the subterranean formation. Furthermore, the water-soluble relative permeability modifiers may attach to the gravel particulates placed into the well bore, and to surfaces within the subterranean formation during normal leak off from the carrier fluid. In some embodiments, the presence of the water-soluble relative permeability modifiers on the gravel particulates and in the formation may reduce the permeability of those areas to aqueous-based fluids without substantially changing the permeability to hydrocarbons. This may reduce fluid loss into the formation from other fluids (e.g., completion fluids) that may be introduced into the well bore subsequent to the carrier fluid and reduce the subsequent problems associated with water flowing into the well bore from the subterranean formation.

In other embodiments, the treatment fluids of the present invention may be placed into the well bore as a pill either prior to or after the stabilization of unconsolidated formation particulates in a section of the subterranean formation penetrated by the well bore. The formation particulates may be stabilized by any suitable technique, including gravel packing and frac packing. In these embodiments, treatment fluids of the present invention that comprise an aqueous-based component and a water-soluble relative permeability modifier may be introduced to the well bore that penetrates the section of the subterranean formation to be stabilized. The desired volume of the treatment fluid of the present invention introduced into the well bore is based, inter alia, on several properties of the section to be treated, such as depth and volume of the section, as well as permeability and other physical properties of material in the section. Among other things, the water-soluble relative permeability modifier included in the treatment fluid of the present invention may attach to surfaces within the subterranean formation during normal leak off from the carrier fluid or to gravel particulates that may have been placed into the well bore. The presence of the water-soluble relative permeability modifiers on the gravel particulates and/or in the formation may reduce the permeability of those areas to aqueous-based fluids without substantially changing the permeability to hydrocarbons. This may reduce fluid loss into the formation from other fluids (e.g., carrier fluids or completion fluids) that may be introduced into the well bore subsequent to the treatment fluid and reduce the subsequent problems associated with water flowing into the well bore from the subterranean formation.

In one embodiment, the present invention provides a method comprising providing a carrier fluid that comprises an aqueous-based component, a water-soluble relative permeability modifier, gravel particulates, and a viscosifying agent; and introducing the carrier fluid into a well bore penetrating a subterranean formation, such that the gravel particulates form a gravel pack near the well bore.

To facilitate a better understanding of the present invention, the following examples of preferred embodiments are given. In no way should the following examples be read to limit, or to define, the scope of the invention.

EXAMPLE 1

A water-soluble relative permeability modifier of the present invention was made by mixing 47.7 grams ("g") of deionized water, 0.38 g of (n-hexadecyl) dimethylammonium ethyl methacrylate bromide, and 1.1 g of acrylamide, and sparging with nitrogen for approximately 30 minutes. Thereafter, a polymerization initiator, such as 0.0127 g of 2,2'-azo bis(2-amidinopropane)dihydrochloride was added. The resulting solution was then heated, with stirring, to 110° F. and held for 18 hours to produce a highly viscous polymer solution, a water-soluble relative permeability modifier of the present invention.

EXAMPLE 2

A water-soluble relative permeability modifier of the present invention was made by mixing 41.2 g of deionized water, 0.06 g of octadecyl methacrylate, 0.45 g of cocoamidopropyl betaine surfactant, and 1.26 g of acrylamide. Thereafter, a polymerization initiator, such as 0.0127 g of 2,2'-azo bis(2-amidinopropane)dihydrochloride was added. The resulting solution was then heated, with stirring, to 110° F. and held for 18 hours to produce a highly viscous polymer solution, a water-soluble relative permeability modifier of the present invention.

EXAMPLE 3

A water-soluble relative permeability modifier of the present invention was made as follows. First, a polymer was made by mixing 1968 g of deionized water, 105 g of dimethylaminoethyl methacrylate ("DMEMA") and sparging with nitrogen for 30 minutes. Thereafter, the pH was adjusted to approximately 7.9 with sulfuric acid and a polymerization initiator, such as 0.46 g of 2,2'-azo bis(2-amidinopropane) dihydrochloride was added. The resulting solution was then heated, with stirring, to 110° F. and held for 18 hours to produce poly-DMEMA.

The poly-DMEMA was then hydrophobically modified by adding 71.0 g of poly-DMEMA to a 250 ml round flask, followed by 15% NaOH to achieve a pH of approximately 8.9. Next, 54.6 g of water, 0.36 g of C16 alkyl (n- hexadecyl) bromide, and 0.39 g of benzylcetyldimethylammonium bromide surfactant were added to quaternize the poly-DMEMA homopolymer and form a DMEMA-n-hexadecyl alkyl-DMEMA copolymer. This mixture was then heated, with stirring, to 140° F. and held for 24 hours to produce a highly viscous polymer solution, a water-soluble relative permeability modifier of the present invention.

EXAMPLE 4

A water-soluble relative permeability modifier of the present invention was made as follows. First, a polymer was made by mixing 45.0 g of dimethylaminoethyl methacrylate, 6.8 g acrylic acid, 372.0 g of water and sparging with nitrogen for 30 minutes. Thereafter, the pH was adjusted to approximately 5.3 with 5.7 mL of concentrated sulfuric acid, followed by the addition of 0.2 mL of 2-mercaptoethanol and 1.3 g of 2,2'-azo bis(2-amidinopropane)dihydrochloride. The resulting solution was then heated to 71° C., with stirring, and held for 18 hours to produce poly(dimethylaminoethyl methacrylate/acrylic acid).

The poly(dimethylaminoethyl methacrylate/acrylic acid) was then hydrophilically modified by adding 95.0 g of the polymer to a 250 mL roundbottom flask, followed by the addition of 5.7 g of a 65% solution of an epichlorohydrin-terminated polyethylene oxide methyl ether and 8.0 g of sodium chloride. Approximately 17 mL of 3% active sodium hydroxide solution was then added to reach a pH of approximately 8.2. The mixture was then heated, with stirring, to 71° C. The viscosity of the solution was monitored, and when the viscosity reached 2000 centipoise (as measured with a Brookfield LVT viscometer, #2 spindle at 12 rpm, 25° C.) the reaction was terminated by removing the heat source and adding 5 mL of 17% hydrochloric acid, 2.0 g sodium chloride and 14.7 g water.

EXAMPLE 5

Gravel suspension tests were performed on several treatment fluid samples. The following procedure was used for this series of tests. For each test, 130 mL of the sample fluid was placed in a 8 ounce bottle with 109 grams of sand. The bottle was then shaken for approximately 30 seconds and the distance from the top of the settling sand to the top of the sample fluid was measured at the intervals indicated below for each sample fluid. The relative permeability modifier used in sample fluids 1A-5 was a DMEMA-n-hexadecyl alkyl-DMEMA copolymer prepared as described in Example 3.

The sample fluid used in Test No. 1A was a treatment fluid that comprised 60 pounds of a viscosifying agent, commercially available under the trade name WG-37™, per 1000 gallons of water, and 7% by weight KCl brine. The sample fluid used in Test No. 1B was a treatment fluid that comprised 60 pounds of WG-37™ per 1000 gallons of water, 7% by weight KCl brine, and 0.1% of a relative permeability modifier. The sample fluid used in Test No. 1C was a treatment fluid that comprised 60 pounds of WG-37™ per 1000 gallons of water, 7% by weight KCl brine, and 0.2% of a relative permeability modifier. Tests No. 1A-1C were performed at 176° F. Table 1 contains the data for Tests No. 1A-1C.

TABLE 1

| Sample Fluid | Settling Distance (cm) at Indicated Time Interval | | | |
| --- | --- | --- | --- | --- |
| | 15 min | 35 min | 65 min | 115 min |
| 1A | 1.6 | 3.3 | 3.8 | 3.9 |
| 1B | 0.9 | 0.9 | 3 | 3.1 |
| 1C | 0 | 0.6 | 0.9 | 2.3 |

The sample fluid used in Test No. 2A was a treatment fluid that comprised 40 pounds of WG-37™ per 1000 gallons of water, and 7% by weight KCl brine. The sample fluid used in Test No. 2B was a treatment fluid that comprised 40 pounds of WG-37™ per 1000 gallons of water, 7% by weight KCl brine, and 0.2% of a relative permeability modifier. Tests No. 2A and 2B were performed at room temperature. Table 2 contains the data for Tests No. 2A and 2B.

TABLE 2

| Sample Fluid | Settling Distance (cm) at Indicated Time Interval | | | |
| --- | --- | --- | --- | --- |
| | 20 min | 33 min | 47 min | 144 min |
| 2A | 1.5 | 1.9 | 2.6 | 3.6 |
| 2B | 0.9 | 1.2 | 1.9 | 2.6 |

The sample fluid used in Test No. 3A was a treatment fluid that comprised 35 pounds of WG-37™ per 1000 gallons of water, and 7% by weight KCl brine. The sample fluid used in Test No. 3B was a treatment fluid that comprised 35 pounds of WG-37™ per 1000 gallons of water, 7% by weight KCl brine, and 0.2% of a relative permeability modifier. Tests No. 3A and 3B were performed at room temperature. Table 3 contains the data for Tests No. 3A and 3B.

TABLE 3

| Sample Fluid | Settling Distance (cm) at Indicated Time Interval | | |
| --- | --- | --- | --- |
| | 25 min | 47 min | 90 min |
| 3A | 3 | 3.4 | 3.4 |
| 3B | 1.2 | 1.6 | 1.6 |

The sample fluid used in Test No. 4A was a treatment fluid that comprised 20 pounds of WG-37™ per 1000 gallons of water, and 7% by weight KCl brine. The sample fluid used in Test No. 4B was a treatment fluid that comprised 20 pounds of WG-37™ per 1000 gallons of water, 7% by weight KCl brine, and 0.2% of a relative permeability modifier. Tests No. 4A and 4B were performed at room temperature. Table 4 contains the data for Tests No. 4A and 4B.

TABLE 4

| Sample Fluid | Settling Distance (cm) at Indicated Time Interval | | | |
| --- | --- | --- | --- | --- |
| | 1 min | 3 min | 21 min | 43 min |
| 4A | 3.7 | 4 | 4.1 | 4.1 |
| 4B | 2.3 | 2.3 | 2.8 | 2.8 |

The sample fluid used in Test No. 5 was a treatment fluid that comprised 2% by weight KCl brine and 0.6% of a relative permeability modifier. Test No. 5 was performed at room temperature. Table 5 contains the data for Test No. 5.

TABLE 5

| Sample Fluid | Settling Distance (cm) at Indicated Time Interval | | | |
| --- | --- | --- | --- | --- |
| | 1 min | 4 min | 30 min | 40 min |
| 5 | 1.8 | 2.3 | 2.5 | 2.6 |

EXAMPLE 6

Fluid loss control tests were performed using a hollow Berea sandstone core with the following dimensions: 2.75-inch length, 2.5-inch outer diameter, 1-inch inner diameter. The Berea sandstone core was mounted in a cell in which fluids can be pumped through the core in two directions. In one direction, defined herein as the "production direction"

fluid is flowed from the exterior of the core, through the core, and into the hollow interior. Fluid also may be flowed in the direction opposite the production direction so that fluid is flowed from the hollow interior of the core, through the core, and to the exterior of the core. Fluid flowing opposite the production direction represents fluid loss from a well bore into the formation. Two treatment solutions were prepared for this series of tests.

The sample fluid used in Test No. 6 (comparative) was a treatment fluid that comprised 20 pounds WG-37™ per 1000 gallons of water. Test No. 6 was performed at 120° F.

The sample fluid used in Test No. 7 was a treatment fluid that comprised 20 pounds WG-37™ per 1000 gallons of water, and 0.2% of a relative permeability modifier by weight. The relative permeability modifier was a DMEMA-n-hexadecyl alkyl-DMEMA copolymer prepared as described in Example 3. Test No. 7 was performed at 120° F.

The following procedure was used for this series of tests. For each test, the core experienced a flow sequence of 1) brine, 2) kerosene, 3) sample fluid, 4) kerosene. The first flow step, brine, was in the production direction and prepared the core for the test. The brine used in the first flow step was a 7% by weight KCl brine. Next, in the second flow step, the kerosene was flowed in the production direction at a constant rate until the pressure stabilized, and the initial permeability of the core was calculated. Thereafter, the sample fluid was placed in the inner hole, and flowed at 10 mL/min. In the fourth flow step, kerosene was flowed at the same rate and the percent regain to kerosene was calculated. Table 6 contains the data for this series of tests.

TABLE 6

| Sample Fluid | Treatment Volume (mL) | Pressure (psi) | % Regain to Kerosene |
| --- | --- | --- | --- |
| 6 | 70 | 155 | — |
|   | 290 | 191 | — |
|   | 400 | 224 | — |
|   | 570 | 272 | 27 |
| 7 | 10 | 334 | — |
|   | 14 | 500 | 46 |

Accordingly, this example indicates that a water soluble relative permeability modifier of the present invention may be useful for controlling fluid loss from a

EXAMPLE 7

The viscosity of several treatment fluids was measured using a Brookfield viscometer. The sample fluid used in Test No. 8 was a treatment fluid that comprised 20 pounds WG-37™ per 1000 gallons of water. The sample fluid used in Test No. 9 was a treatment fluid that comprised 20 pounds WG-37™ per 1000 gallons of water, and 0.2% of a relative permeability modifier by weight. The relative permeability modifier was a DMEMA-n-hexadecyl alkyl-DMEMA copolymer prepared as described in Example 3. The sample fluid used in Test No. 10 was a treatment fluid that comprised 0.6% of a relative permeability modifier by weight. The relative permeability modifier was a DMEMA-n-hexadecyl alkyl-DMEMA copolymer prepared as described in Example 3. Table 7 contains the data for this series of tests.

TABLE 7

| Sample Fluid | Viscosity (centipoise) |
| --- | --- |
| 8 | 176 |
| 9 | 212 |
| 10 | 17 |

Accordingly, this example indicates that a water soluble relative permeability modifier of the present invention may enhance the viscosity of a treatment fluid.

Therefore, the present invention is well adapted to attain the ends and advantages mentioned as well as those that are inherent therein. The particular embodiments disclosed above are illustrative only, as the present invention may be modified and practiced in different but equivalent manners apparent to those skilled in the art having the benefit of the teachings herein. While numerous changes may be made by those skilled in the art, such changes are encompassed within the spirit of this invention as defined by the appended claims. Furthermore, no limitations are intended to the details of construction or design herein shown, other than as described in the claims below. It is therefore evident that the particular illustrative embodiments disclosed above may be altered or modified and all such variations are considered within the scope and spirit of the present invention. In particular, every range of values (e.g., "from about a to about b," or, equivalently, "from approximately a to b," or, equivalently, "from approximately a-b") disclosed herein is to be understood as referring to the power set (the set of all subsets) of the respective range of values. The terms in the claims have their plain, ordinary meaning unless otherwise explicitly and clearly defined by the patentee.

What is claimed is:

1. A method comprising:
   providing a carrier fluid comprising an aqueous-based component, a water-soluble relative permeability modifier, and gravel particulates,
   wherein the water-soluble relative permeability modifier suspends at least a portion of the gravel particulates,
   wherein the water-soluble relative permeability modifier comprises a polymer backbone that comprises polar heteroatoms, and
   wherein the water-soluble relative permeability modifier:
      is a hydrophobically modified polymer that comprises a reaction product of a hydrophobic compound and a hydrophilic polymer, wherein the hydrophobic compound is selected from the group consisting of an anhydride of octenyl succinic acid, an ester of octenyl succinic acid, an imide of octenyl succinic acid, an amide of octenyl succinic acid, an anhydride of dodecenyl succinic acid, an ester of dodecenyl succinic acid, an imide of dodecenyl succinic acid, and an amide of dodecenyl succinic acid; and
      exhibits a mole ratio of hydrophilic monomer to the hydrophobic compound of from 99.98:0.02 to 90:10 wherein the hydrophilic monomer is a calculated amount present in the hydrophilic polymer; and,
   introducing the carrier fluid into a well bore penetrating a subterranean formation, such that the gravel particulates form a gravel pack near the well bore, such that the water-soluble relative permeability modifier reduces the water permeability of the gravel pack.

2. The method of claim 1 wherein the carrier fluid is introduced into the well bore at a pressure sufficient to create or enhance at least one fracture in the subterranean formation.

3. The method of claim 1 wherein the hydrophilic polymer is selected from the group consisting of: an alkyl acrylate polymer, a polyvinylamine; a poly(vinylamine/vinyl alcohol); a cellulose; a chitosan; a polyamide; a polyetheramine; a polyethyleneimine; a polyhydroxyetheramine; a polylysine; a polysulfone; a gum; a starch; and derivatives thereof.

4. The method of claim 1 further comprising a viscosifying agent wherein the viscosifying agent is selected from the group consisting of xanthan, guar or guar derivatives, cellulose derivatives, a viscoelastic surfactant, and combinations thereof.

5. A method comprising:
providing a carrier fluid comprising an aqueous-based component, a water-soluble relative permeability modifier, and gravel particulates,
wherein the carrier fluid is substantially free of a viscosifying agent,
wherein the water-soluble relative permeability modifier comprises a polymer backbone that comprises polar heteroatoms, and
wherein the water-soluble relative permeability modifier:
is a hydrophobically modified polymer that comprises a reaction product of a hydrophobic compound and a hydrophilic polymer; wherein the hydrophobically modified polymer comprises a hydrophobic branch having an alkyl group of from about 4 carbons to about 22 carbons;
wherein the hydrophobic compound is selected from the group consisting of an anhydride of octenyl succinic acid, an ester of octenyl succinic acid, an imide of octenyl succinic acid, an amide of octenyl succinic acid, an anhydride of dodecenyl succinic acid, an ester of dodecenyl succinic acid, an imide of dodecenyl succinic acid, and an amide of dodecenyl succinic acid; and,
exhibits a mole ratio of hydrophilic monomer to the hydrophobic compound of from 99.98:0.02 to 90:10 wherein the hydrophilic monomer is a calculated amount present in the hydrophilic polymer; and
allowing the water-soluble relative permeability modifier to suspend at least a portion of the gravel particulates; and
introducing the carrier fluid into a well bore penetrating a subterranean formation, such that the gravel particulates form a gravel pack near the well bore, such that the water-soluble relative permeability modifier reduces the water permeability of the gravel pack.

6. The method of claim 5 wherein the hydrophilic polymer is selected from the group consisting of: an alkyl acrylate polymer, a polyvinylamine; a poly(vinylamine/vinyl alcohol); a cellulose; a chitosan; a polyamide; a polyetheramine; a polyethyleneimine; a polyhydroxyetheramine; a polylysine; a polysulfone; a gum; a starch; and derivatives thereof.

* * * * *